(12) United States Patent
Shimizu (10) Patent No.: US 11,241,766 B2
(45) Date of Patent: Feb. 8, 2022

(54) NUMERICAL CONTROL APPARATUS

(71) Applicant: FANUC CORPORATION, Yamanashi (JP)

(72) Inventor: Tsuyuki Shimizu, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 17/065,835

(22) Filed: Oct. 8, 2020

(65) Prior Publication Data

US 2021/0129281 A1 May 6, 2021

(30) Foreign Application Priority Data

Nov. 5, 2019 (JP) .............................. JP2019-200510

(51) Int. Cl.
| | |
|---|---|
| *B23Q 15/24* | (2006.01) |
| *B23Q 17/22* | (2006.01) |
| *B23Q 15/26* | (2006.01) |
| *G05B 19/404* | (2006.01) |

(52) U.S. Cl.
CPC ............. *B23Q 15/24* (2013.01); *B23Q 15/26* (2013.01); *B23Q 17/2233* (2013.01); *G05B 19/404* (2013.01)

(58) Field of Classification Search
None
See application file for complete search history.

(56) References Cited

U.S. PATENT DOCUMENTS

| | | | | |
|---|---|---|---|---|
| 2012/0304478 | A1* | 12/2012 | Matsushita | G01B 21/045 33/701 |
| 2018/0246492 | A1* | 8/2018 | Ido | G05B 19/404 |
| 2019/0084112 | A1* | 3/2019 | Kojima | B23Q 15/24 |

FOREIGN PATENT DOCUMENTS

| | | |
|---|---|---|
| JP | 3174704 B2 | 6/2001 |
| JP | 2009-146057 A | 7/2009 |

* cited by examiner

*Primary Examiner* — Ryan A Jarrett
(74) *Attorney, Agent, or Firm* — Studebaker & Brackett PC (57) ABSTRACT

A numerical control apparatus for controlling a tool attached to a column of a machine tool includes a compensation data setting unit that sets, as selection input, a linear drive axis combination of the column, a tilt direction of the column, and a perpendicularity error of the column, and a compensation amount calculation unit that generates a tool vector from a tool length as a distance in an axial direction from a tool attachment position to a tool tip end and a tool diameter as a distance in a direction perpendicular to the axial direction from the tool attachment position to the tool tip end to calculate a position compensation amount of the tool tip end as a machining point in an execution program from the linear drive axis combination of the column, the tilt direction of the column, and the perpendicularity error of the column set by the compensation data setting unit and the tool vector.

2 Claims, 10 Drawing Sheets

```
PERPENDICULARITY ERROR INPUT SCREEN            730

E1  =  [        ] deg   : EC0Y
(E1')                     (-EC0Y)

E2  =  [        ] deg   : EA0Y
(E2')                     (-EA0Y)
```

PERPENDICULARITY ERROR INPUT SCREEN — 730

E1 = [ ] deg : EB0Z

E2 = [ ] deg : EA0Y

E3 = [ ] deg : EB0W

E4 = [ ] deg : EA0W

NUMERICAL CONTROL APPARATUS

This application is based on and claims the benefit of priority from Japanese Patent Application No. 2019-200510, filed on 5 Nov. 2019, the content of which is incorporated herein by reference.

BACKGROUND OF THE INVENTION

Field of the Invention

The present invention relates to a numerical control apparatus.

Related Art

Operation of a machine tool along multiple axes such as X-, Y-, and Z-axes can be controlled by a numerical control apparatus, and high-accuracy machining can be performed for a workpiece by a tool attached to a spindle. However, when a position error (a perpendicularity error) is caused such that a column to which the spindle is attached slightly tilts relative to a base, machining quality might be degraded due to an error in the relative position between a tool tip end and a workpiece machining point.

Typically, for compensating an error due to a mechanical system of the machine tool, a technique in which a three-dimensional coordinate system is divided into grid areas, a grid point compensation vector is stored at each grid point, and a current position compensation vector is calculated based on the grid point compensation vector to compensate a position error has been known (see Japanese Patent No. 3174704). Moreover, a technique in which a tool length difference between a reference tool and a used tool is calculated, and a deviation amount is calculated based on, the tool length difference and a perpendicularity error between two axes perpendicular to each other, and a positioning error is compensated based on the deviation amount has been also known (see Japanese Unexamined Patent Application, Publication No. 2009-146057).

Patent Document 1: Japanese Patent No. 3174704
Patent Document 2: Japanese Unexamined Patent Application, Publication No. 2009-146057

SUMMARY OF THE INVENTION

However, the technique described in Japanese Patent No. 3174704 is a technique used as a compensation technique for adjusting an assembly error upon machine shipment, and it is difficult to measure an error at each grid point and to calculate and set the compensation amount. For this reason, an operator cannot easily and additionally compensate a perpendicularity error due to tilt of a column caused due to a chronological change in the machine tool. Moreover, the technique described in Japanese Unexamined Patent Application, Publication No. 2009-146057 cannot perform compensation in consideration of influence of a tool diameter difference. Thus, there has been a demand for a numerical control apparatus capable of easily compensating a perpendicularity error due to a chronological change in a machine tool by a user in consideration of not only a tool length difference but also a tool diameter difference.

One aspect of the present disclosure is a numerical control apparatus for controlling a tool attached to a column, the numerical control apparatus including a compensation data setting unit that sets, as selection input, a linear drive axis combination of the column, a tilt direction of the column, and a perpendicularity error of the column and a compensation amount calculation unit that generates a tool vector from a tool length as a distance in an axial direction from a tool attachment position to a tool tip end and a tool diameter as a distance in a direction perpendicular to the axial direction from the tool attachment position to the tool tip end to calculate a position compensation amount of the tool tip end as a machining point in an execution program from the linear drive axis combination of the column, the tilt direction of the column, and the perpendicularity error of the column set by the compensation data setting unit and the tool vector.

According to one aspect, the numerical control apparatus capable of easily compensating an error due to a chronological change in a machine tool by a user in consideration of not only a tool length difference but also a tool diameter difference can be provided.

DETAILED DESCRIPTION OF THE INVENTION

Figure 1:
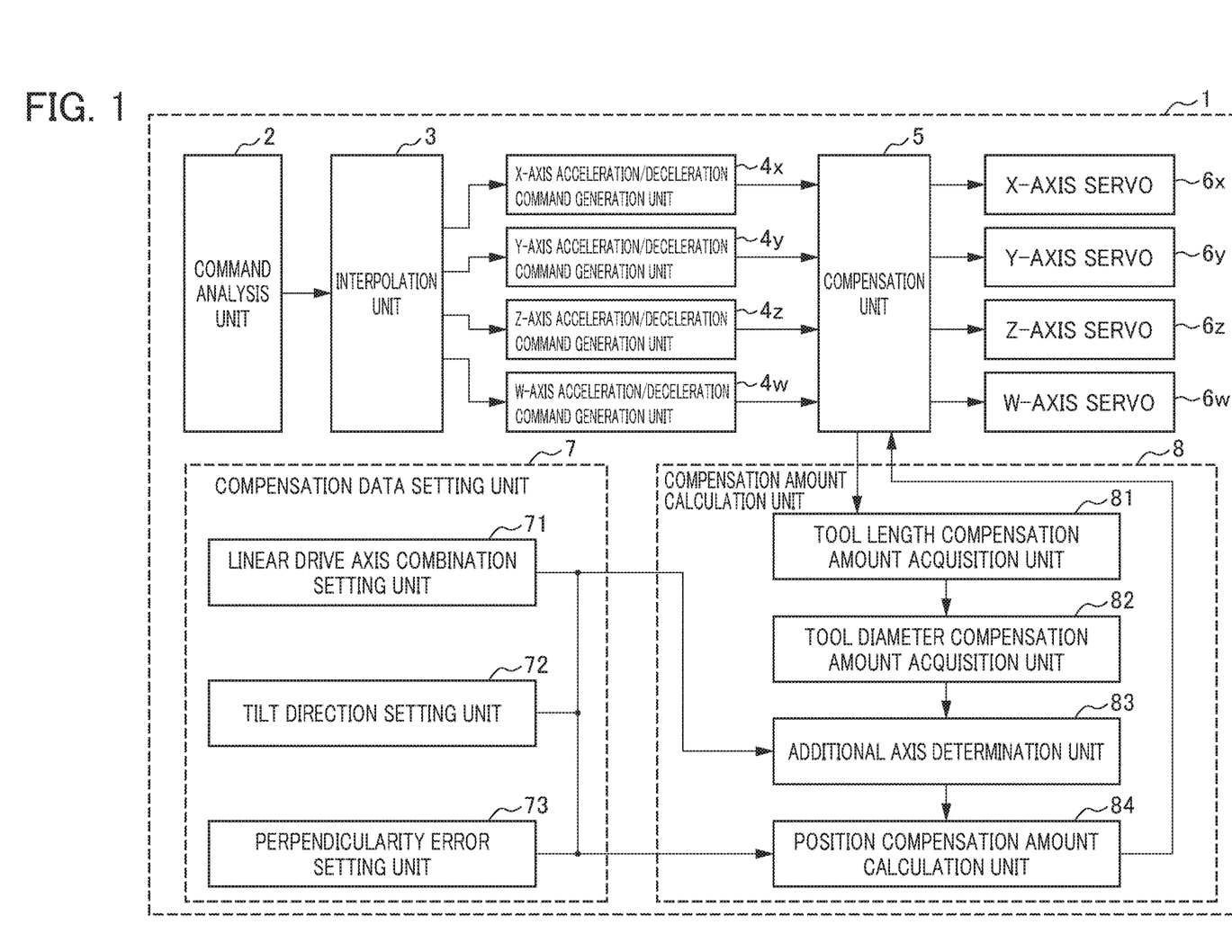
FIG. 1 is a functional block diagram showing a configuration of a numerical control apparatus according to one aspect of the present disclosure.

Hereinafter, one aspect of the present disclosure will be described with reference to the drawings. FIG. 1 is a functional block diagram showing a configuration of a numerical control apparatus according to one aspect of the present disclosure. The numerical control apparatus 1 shown in FIG. 1 controls a machine tool that relatively moves a tool arranged on a column and a workpiece arranged below the tool (both are not shown) along an X-axis, a Y-axis, and a Z-axis as axes perpendicular to each other to perform machining for the workpiece. The numerical control apparatus 1 has a command analysis unit 2, an interpolation unit 3, X-, Y-, Z-, and W-axis acceleration/deceleration command generation units 4X, 4Y, 4Z, 4W, a compensation unit 5, X-, Y-, Z-, and W-axis servos 6X, 6Y, 6Z, 6W, a compensation data setting unit 7, and a compensation amount calculation unit 8.

The command analysis unit 2 analyzes an execution program for the machining of the workpiece by the tool, thereby generating a movement command for operating each of the X-, Y-, Z-, and W-axes of the machine tool based on the execution program. The movement command generated in the command analysis unit 2 is outputted to the interpolation unit 3. The interpolation unit 3 converts the movement command for each of the X-, Y-, Z-, and W-axes from the command analysis unit 2 into an interpolation movement amount. The interpolation movement amount generated for each of the X-, Y-, Z-, and W-axes by the interpolation unit 3 are each outputted to the X-, Y-, Z-, and W-axis acceleration/deceleration command generation units 4X, 4Y, 4Z, 4W.

The X-, Y-, Z-, and W-axis acceleration/deceleration command generation units 4X, 4Y, 4Z, 4W each generate, based on the interpolation movement amounts transmitted from the interpolation unit 3, speed commands for operating the X-, Y-, Z-, and W-axes to move to target positions. Each of the generated speed commands for the X-, Y-, Z-, and W-axes is outputted to the compensation unit 5. The compensation unit 5 outputs the speed command for each of the X-, Y-, Z-, and W-axes after a perpendicularity error of the column of the machine tool has been compensated by the later-described compensation data setting unit 7 and the later-described compensation amount calculation unit 8 to a corresponding one of the X-, Y-, Z-, and W-axis servos 6X, 6Y, 6Z, 6W. The X-, Y-, Z-, and W-axis servos 6X, 6Y, 6Z, 6W control rotation of drive motors (not shown) of the X-, Y-, Z-, and W-axes based on the speed commands having been compensated by the compensation unit 5. With this configuration, the X-, Y-, Z-, and W-axis servos 6X, 6Y, 6Z, 6W relatively move the tool and the workpiece along each of the X-, Y-, Z-, and W-axes.

The compensation data setting unit 7 has a linear drive axis combination setting unit 71, a tilt direction setting unit 72, and a perpendicularity error setting unit 73. The compensation data setting unit 7 accepts a selection input from an operator as a user and sets the column perpendicularity error compensation data using these setting units 71, 72, 73. The selection input to the compensation data setting unit 7 from the operator may be, for example, made via touch input on a monitor screen or input operation of a keyboard. The monitor screen is, for example, a monitor screen provided in the numerical control apparatus 1 or a monitor screen of an external terminal, such as a personal computer, connected to the numerical control apparatus 1.

Figure 3:
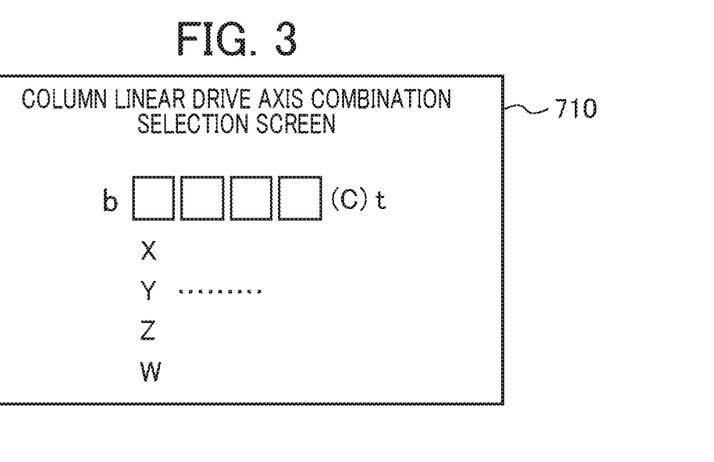
FIG. 3 is a view showing a column linear drive axis combination selection screen in a linear drive axis combination setting unit in the numerical control apparatus according to one aspect of the present disclosure.
Figure 4:
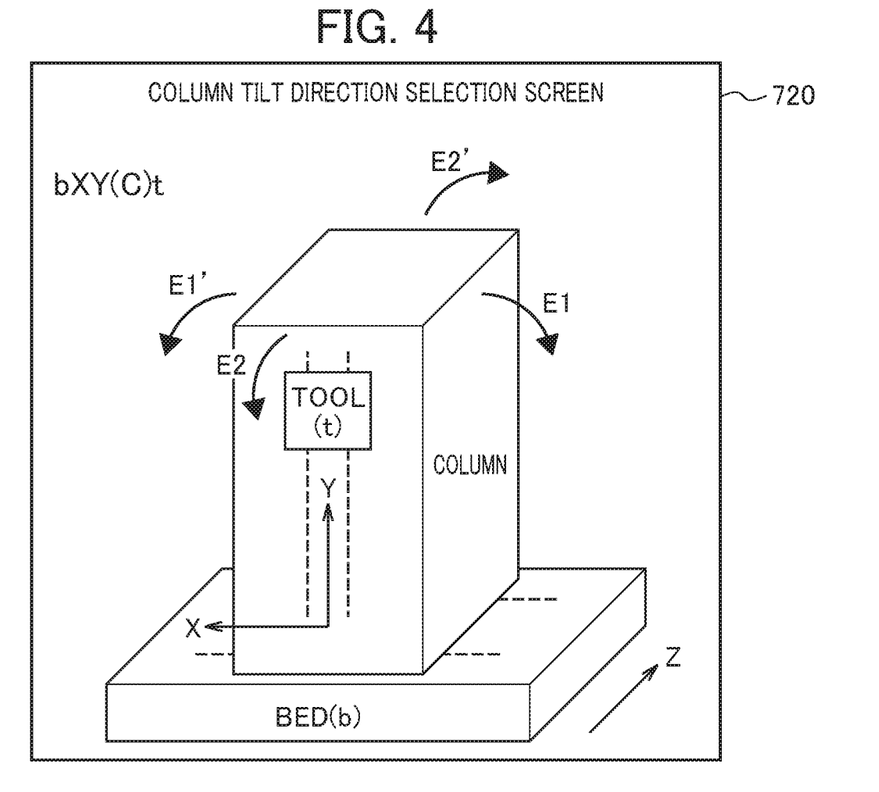
FIG. 4 is a view showing a column tilt direction selection screen in a tilt direction setting unit in the numerical control apparatus according to one aspect of the present disclosure.
Figure 5:
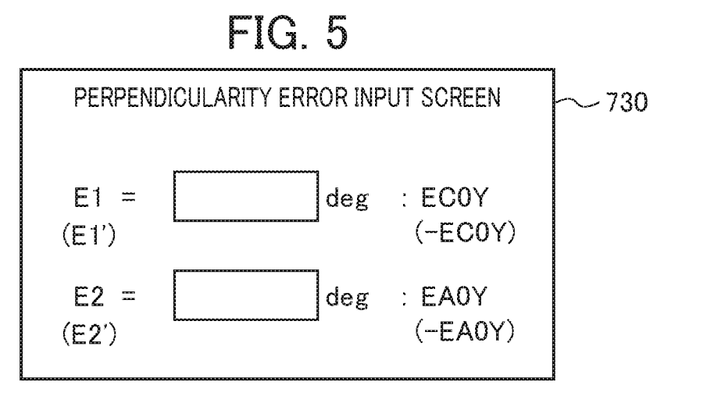
FIG. 5 is a view showing a perpendicularity error input screen in a perpendicularity error setting unit in the numerical control apparatus according to one aspect of the present disclosure.

The linear drive axis combination setting unit 71, the tilt direction setting unit 72, and the perpendicularity error setting unit 73 display, for the operator, selection screens 710, 720, 730 as shown in FIGS. 3, 4, and 5 on the monitor screen. The linear drive axis combination setting unit 71, the tilt direction setting unit 72, and the perpendicularity error setting unit 73 (the selection screens 710, 720, 730) cooperate with each other. That is, it is configured such that an input result on any of the selection screens 710, 720, 730 is reflected in indications on the other ones of the selection screens 710, 720, 730. The selection screens 710, 720, 730 may be displayed in sequence one by one on the monitor screen, or any two or more of the selection screens may be simultaneously displayed on the single monitor screen.

The linear drive axis combination setting unit 71 displays the column linear drive axis combination selection screen 710 as shown in FIG. 3, for example. With this configuration, the linear drive axis combination setting unit 71 accepts the column linear drive axis combination selection input as machine information on the machine tool from the operator, thereby setting such a selected and inputted linear drive axis combination.

Figure 2A:
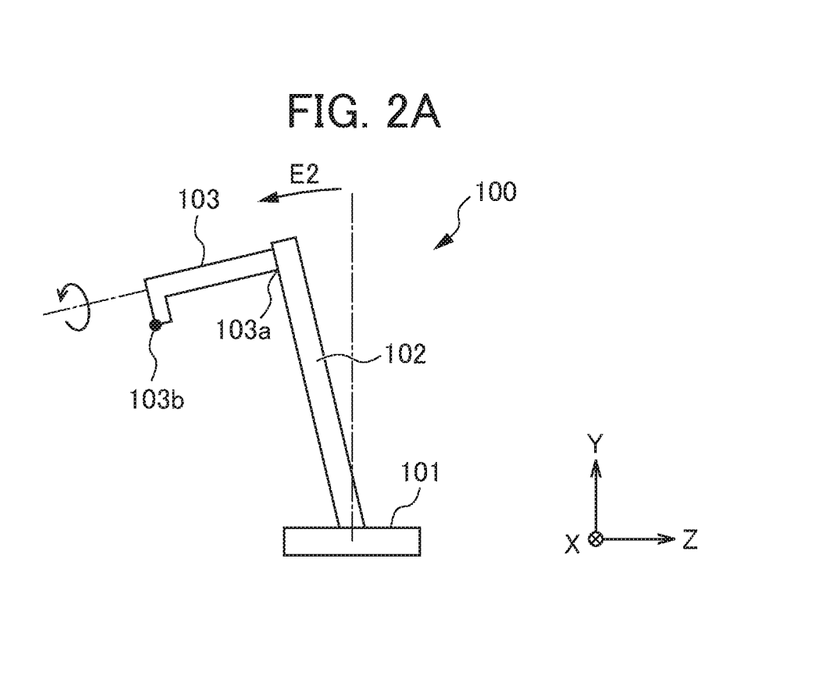
FIG. 2A is a schematic view showing tilt directions of a column in a machine tool.
Figure 2B:
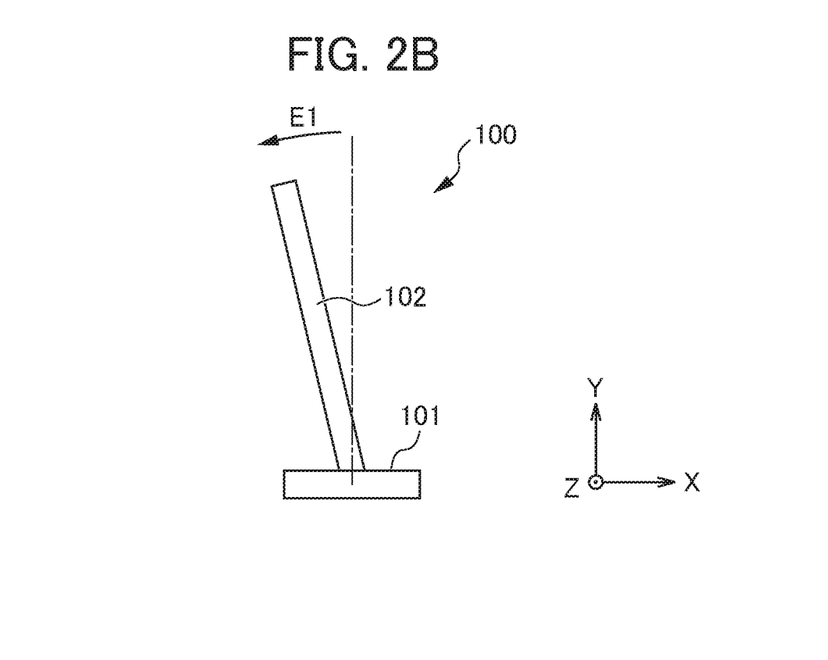
FIG. 2B is a schematic view showing the tilt directions of the column in the machine tool.

The linear drive axis combination is a combination of the drive axes necessary for defining a tilt direction with reference to the X-, Y-, Z-, and W-axes of the column in the machine tool. For example, as schematically shown in FIGS. 2A and 2B, the machine tool 100 includes the column 102 vertically standing on a bed 101 in a Y-axis direction. The column 102 is provided reciprocatably along an X-axis direction perpendicular to the Y-axis on the bed 101. A tool 103 is attached to a spindle (not shown) provided movably along the Y-axis direction on one side surface of the column 102. The machine tool 100 does not have the W-axis. In the case of such a machine tool 100, the drive axes of the column 102 are the X-axis and the Y-axis. Thus, on the column linear drive axis combination selection screen 710, "bXY(C)t" is inputted by the operator. Note that "b" indicates the bed 101 of the machine tool 100, and "t" indicates the tool 103. "(C)" indicates the spindle.

For the column linear drive axis combination ("bXY(C)t") selected and inputted by the operator in the linear drive axis combination setting unit 71, the tilt direction setting unit 72 displays, for example, the column tilt direction selection screen 720 as shown in FIG. 4. With this configuration, the tilt direction setting unit 72 accepts the selection input of the column tilt directions E1, E1', E2, E2' from the operator, thereby setting these selected and inputted tilt directions. The tilt directions E1, E1' are directions opposite to each other along the X-axis. The tilt directions E2, E2' are directions opposite to each other perpendicular to the X-axis. The Z-axis is an axis in a direction perpendicular to the X-axis and the Y-axis, and indicates a movement direction of a table (not shown) on which the workpiece is placed.

Tilt of the column selected and inputted by the operator is caused only by a chronological change in the machine tool 100. Thus, e.g., before the machine tool 100 starts the machining for the workpiece, the operator measures, taking a state in which the column 102 of the machine tool 100 stands perpendicularly to the bed 101 along the Y-axis as a reference position of the column 102, the tilt direction and the tilt angle of the column 102 with respect to the reference position in advance by means of an optional measuring instrument such as a gauge, a laser measuring instrument, or a touch probe. On the column tilt direction selection screen 720, the operator selects any two of the tilt directions E1, E1', E2, E2' displayed on the column tilt direction selection screen 720 to input information on the tilt direction of the column 102.

Figure 6A:
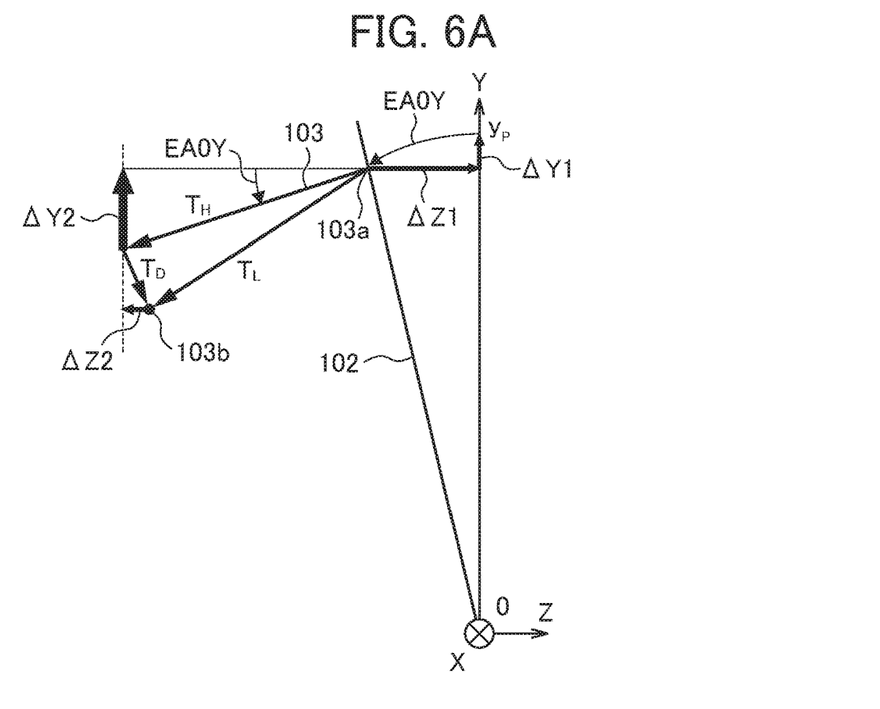
FIG. 6A is a diagram showing the tilt directions of the column in the machine tool by vectors.
Figure 6B:
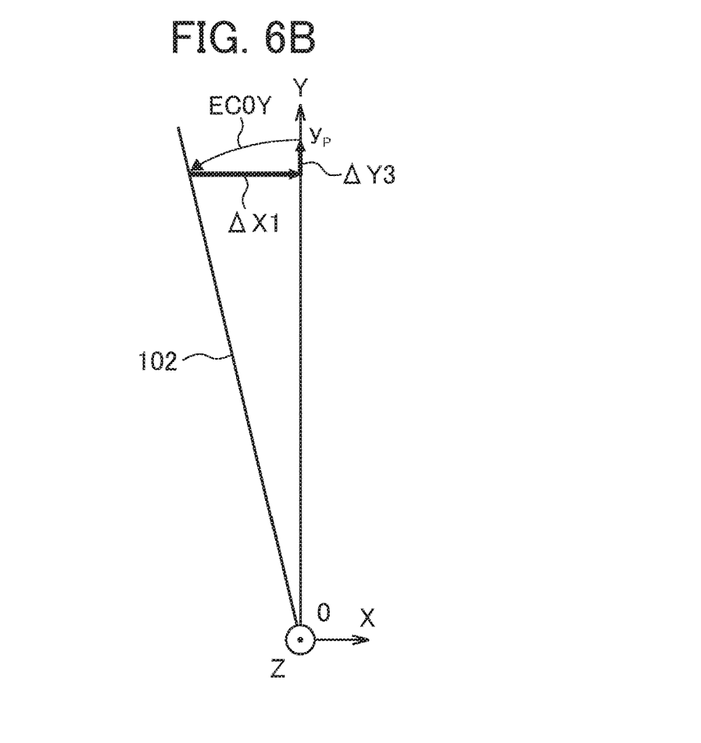
FIG. 6B is a diagram showing the tilt directions of the column in the machine tool by vectors.

It is assumed herein that tilt of the column 102 in two directions E1, E2 with respect to the bed 101 is caused as shown in FIGS. 2A and 2B. In this case, on the column tilt direction selection screen 720, the tilt directions E1, E2 are selected and inputted by the operator, and are set in the tilt direction setting unit 72. Note that although the actual tilt angle of the column 102 is invisibly small, the tilt angle of the column 102 is exaggerated in FIGS. 2A and 2B for easy understanding. FIGS. 6A and 6B show, by vectors, the tilt direction of the column 102 shown in FIGS. 2A and 2B.

For the tilt directions E1, E2 selected and inputted by the operator in the tilt direction setting unit 72, the perpendicularity error setting unit 73 displays the perpendicularity error input screen 730 as shown in, e.g., FIG. 5. With this configuration, the perpendicularity error setting unit 73 accepts the input of the tilt angle as the perpendicularity error in the tilt directions E1, E2 of the column 102 from the operator, thereby setting such an inputted tilt angle.

That is, the operator inputs, on the perpendicularity error input screen 730, the tilt angle in each of the tilt directions E1, E2, the tilt angle being measured together with the tilt direction of the column 102 for selecting and inputting the tilt direction on the column tilt direction selection screen 720. The tilt angles in the two inputted tilt directions E1, E2 are each automatically converted into ISO/JIS standard data.

As described above, in the linear drive axis combination setting unit 71, the tilt direction setting unit 72, and the perpendicularity error setting unit 73, when each type of information on the column linear drive axis combination, the column tilt direction, and the column perpendicularity error is inputted and set by the operator, the compensation data setting unit 7 outputs each type of set information as described above to the compensation amount calculation unit 8.

The compensation amount calculation unit 8 has a tool length compensation amount acquisition unit 81, a tool diameter compensation amount acquisition unit 82, an additional axis determination unit 83, and a position compensation amount calculation unit 84. The compensation amount calculation unit 8 calculates, using these units, a position compensation amount of a tool tip end 103b as a machining point in the execution program.

The tool length compensation amount acquisition unit 81 acquires, for example, information on a tool length $T_H$ stored in advance in the compensation unit 5 and associated with each tool 103 based on a G-code "G43 H1 Z0" for tool length compensation in a numerical control program of the numerical control apparatus 1. As shown in FIG. 6A, the tool length $T_H$ is a distance in an axial direction of the tool from a tool attachment position 103a to the tool tip end 103b.

The tool diameter compensation amount acquisition unit 82 acquires, for example, a tool diameter $T_D$ stored in advance in the compensation unit 5 and associated with each tool 103 based on a G-code "G41 D1 X0 Y0" for tool diameter compensation in the numerical control program of the numerical control apparatus 1. As shown in FIG. 6A, the tool diameter $T_D$ is a distance in a direction perpendicularly to the axial direction of the tool from the tool attachment position 103a to the tool tip end 103b.

The compensation amount calculation unit 8 generates a tool vector $T_L$ from the tool length $T_H$ acquired by the tool length compensation amount acquisition unit 81 and the tool diameter $T_D$ acquired by the tool diameter compensation amount acquisition unit 82. The tool vector $T_L$ is obtained by $T_L = T_H + T_D$. The tool vector $T_L$ can be, for example, generated in the tool diameter compensation amount acquisition unit 82 in such a manner that the tool length $T_H$ acquired by the tool length compensation amount acquisition unit 81 is outputted to the tool diameter compensation amount acquisition unit 82, as shown in FIG. 1.

The additional axis determination unit 83 determines, from the information of the linear drive axis combination setting unit 71, whether or not there is an additional axis (the W-axis) moving in parallel with any of the moving axes (the X-, Y-, and Z-axes) of the column 102 in the machine tool 100. As shown in FIGS. 2A, 2B, and 4, the machine tool 100 having no additional axis (no W-axis) is targeted herein, and therefore, the additional axis determination unit 83 has no function.

The position compensation amount calculation unit 84 calculates the position compensation amounts $\Delta X$, $\Delta Y$, $\Delta Z$ of the tool tip end 103b for the X-, Y-, and Z-axes from each type of information on the linear drive axis combination of the column 102, the tilt direction of the column 102, and the perpendicularity error of the column 102 transmitted from the compensation data setting unit 7 and the above-described tool vector $T_L$. Specifically, as shown in FIGS. 6A and 6B, the position compensation amounts $\Delta X$, $\Delta Y$, $\Delta Z$ are obtained according to the following calculation formulae.

$$\Delta X = \Delta X1 = (y_P \cdot EC0Y)_X$$

$$\Delta Y = \Delta Y1 + \Delta Y2 + \Delta Y3 = (y_P \cdot EA0Y)_Y + (T_L \cdot EA0Y)_Y + (y_P \cdot EC0Y)_Y$$

$$\Delta Z = \Delta Z1 - \Delta Z2 = (y_P \cdot EA0Y)_Z + (T_L \cdot EA0Y)_Z$$

In the above-described formulae, $y_P$ indicates Y-axis machine coordinates (tool position), EC0Y indicates the perpendicularity (radian) of the Y-axis about the Z-axis, EA0Y indicates the perpendicularity (radian) of the Y-axis about the X-axis, $(y_P \cdot EC0Y)_X$ indicates an X-axis component rotating $y_P$ by EC0Y, $(y_P \cdot EC0Y)_Y$ indicates a Y-axis component rotating $y_P$ by EC0Y, $(y_P \cdot EA0Y)_Y$ and $(T_L \cdot EA0Y)_Y$ each indicate Y-axis components rotating $y_P$ and $T_L$ by EA0Y, and $(y_P \cdot EA0Y)_Z$ and $(T_L \cdot EA0Y)_Z$ each indicate Z-axis components rotating $y_P$ and $T_L$ by EA0Y.

The compensation amount calculation unit 8 outputs the position compensation amounts $\Delta X$, $\Delta Y$, $\Delta Z$ obtained as described above in the position compensation amount calculation unit 84 to the compensation unit 5. The compensation unit 5 adds each of the position compensation amounts $\Delta X$, $\Delta Y$, $\Delta Z$ transmitted from the compensation amount calculation unit 8 to a corresponding one of the X-, Y-, and Z-axis speed commands transmitted from the X-, Y-, and Z-axis acceleration/deceleration command generation units 4X, 4Y, 4Z. With this configuration, the compensation unit 5 outputs each of the X-, Y-, and Z-axis speed commands after the perpendicularity error of the column 102 has been compensated to a corresponding one of the X-, Y-, and Z-axis servos 6X, 6Y, 6Z. Thus, each of the X-, Y-, and Z-axis drive motors (not shown) rotatably controlled by the X-, Y-, and Z-axis servos 6X, 6Y, 6Z can relatively move the tool 103 and the workpiece (not shown) along each of the X-, Y-, and Z-axes according to the speed commands after the perpendicularity error of the column 102 has been compensated according to the tool length and the tool diameter.

Figure 7A:
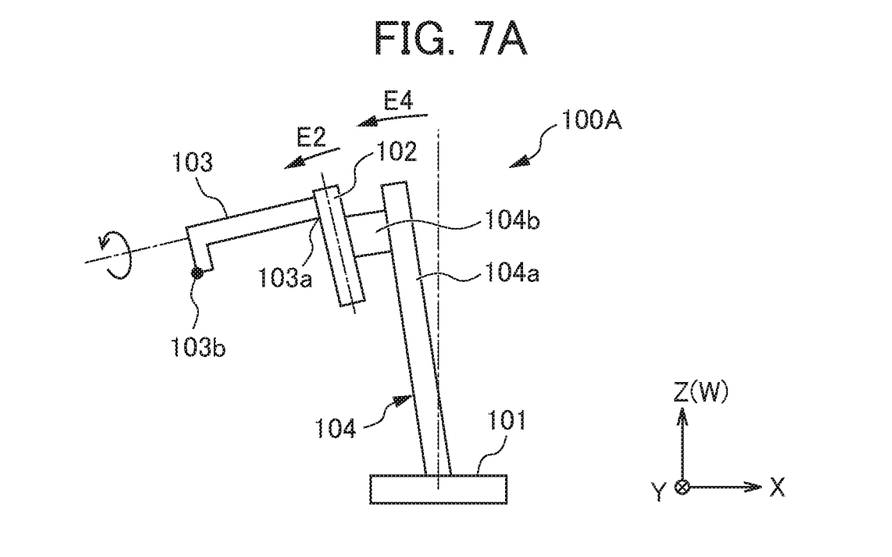
FIG. 7A is a schematic view showing tilt directions of a column in a machine tool having an additional axis.
Figure 7B:
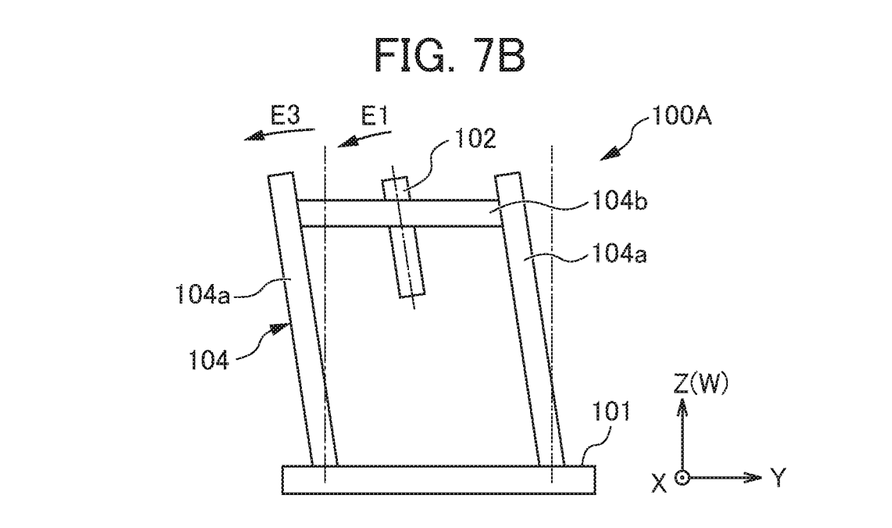
FIG. 7B is a schematic view showing the tilt directions of the column in the machine tool having the additional axis.
Figure 8:
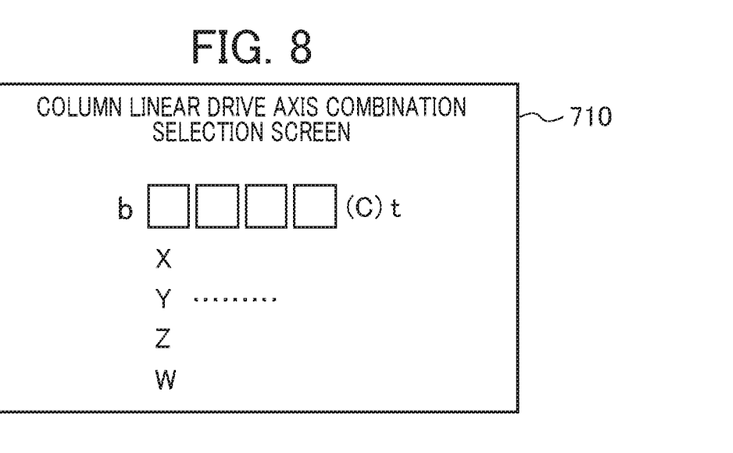
FIG. 8 is a view showing a column linear drive axis combination selection screen in a linear drive axis combination setting unit in a numerical control apparatus according to another aspect of the present disclosure.

Next, a case where the numerical control apparatus 1 performs position compensation for a tool attached to a column of a machine tool having an additional axis (the W-axis) will be described. FIGS. 7A and 7B schematically show the machine tool 100A having a cross rail 104 as the additional axis. The cross rail 104 is configured such that a single horizontal rail 104b is bridged between a pair of vertical rails 104a vertically standing on the bed 101 along the W-axis parallel to the Z-axis. The horizontal rail 104b is attached so as to move up and down in a W-axis direction along the vertical rails 104a. The column 102 is attached to the horizontal rail 104b so as to move along the Y-axis direction. That is, the column 102 is provided and operated on the cross rail 104. The tool 103 is attached to the spindle (not shown). The spindle is provided movably along a Z-axis direction on one side surface of the column 102. The X-axis is a direction perpendicular to the Y-axis and the Z-axis (the W-axis). The X-axis indicates the movement direction of the table (not shown) on which the workpiece is placed. Generally, the column 102 is expressed as a saddle, and the vertical rails 104a are expressed as right and left columns.

In the case of such a machine tool 100A, the drive axes of the column 102 are the X-axis, the Z-axis, and the W-axis, and therefore, the operator inputs "bWYZ(C)t" on the column linear drive axis combination selection screen 710 of the compensation data setting unit 7. That is, in the case of the machine tool 100A having the cross rail 104 as the additional axis (the W-axis), the compensation data setting unit 7 of the numerical control apparatus 1 is configured to select and input not only the linear drive axis combination of the column 102 but also a linear drive axis combination of the cross rail 104.

Figure 9:
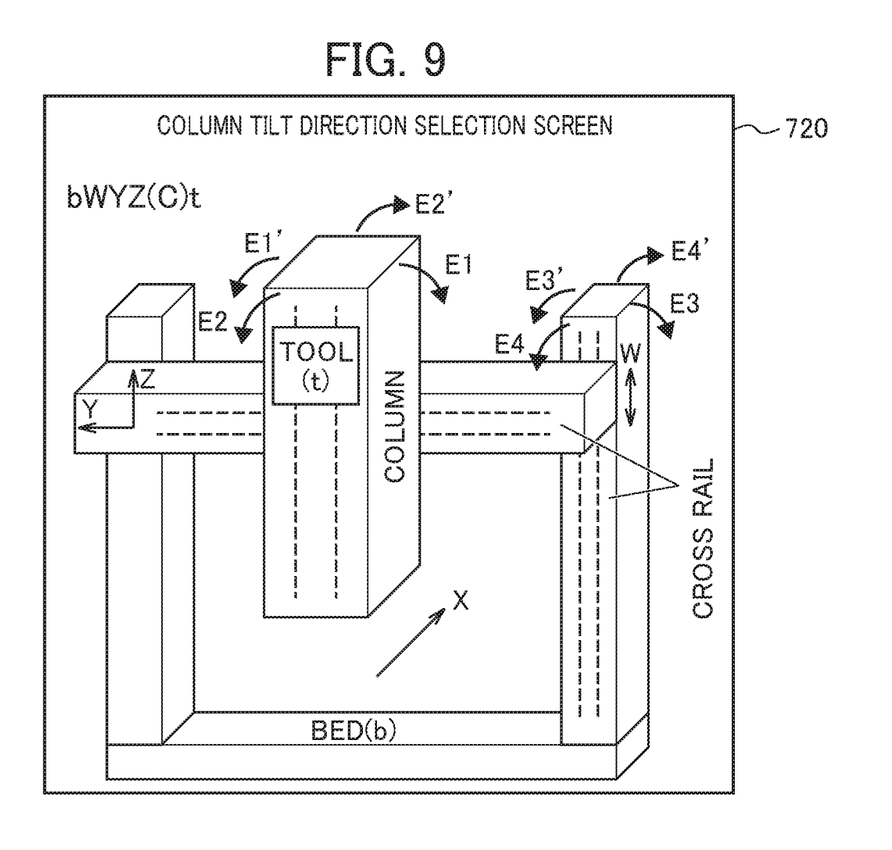
FIG. 9 is a view showing a column tilt direction selection screen in a tilt direction setting unit in the numerical control apparatus according to another aspect of the present disclosure.

Next, the tilt direction setting unit 72 displays, on the column tilt direction selection screen 720 as shown in FIG. 9, the column linear drive axis combination ("bWYZ(C)t") including the additional axis (the W-axis) and selected and inputted by the operator in the linear drive axis combination setting unit 71, for example. In this case, the tilt direction includes tilt directions E3, E3', E4, E4' of the cross rail 104 in addition to the tilt directions E1, E1', E2, E2' of the column 102. With this configuration, the tilt direction setting unit 72 accepts the selection input of the tilt directions E1, E1', E2, E2' of the column 102 and the tilt directions E3, E3', E4, E4' of the cross rail 104 from the operator, thereby setting these selected and inputted tilt directions. The tilt directions E3, E3' of the cross rail 104 are directions opposite to each other along the X-axis. The tilt directions E4, E4' are directions opposite to each other along the Y-axis.

As in the case of the machine tool 100, the operator measures the tilt direction and the tilt angle of each of the column 102 and the cross rail 104 of the machine tool 100A in advance by means of the optional measuring instrument. On the column tilt direction selection screen 720, the operator selects any two of the tilt directions E1, E1', E2, E2' of the column 102 and any two of the tilt directions E3, E3', E4, E4' of the cross rail 104 displayed on the column tilt direction selection screen 720, and inputs the information on the tilt direction of the column 102.

Figure 11A:
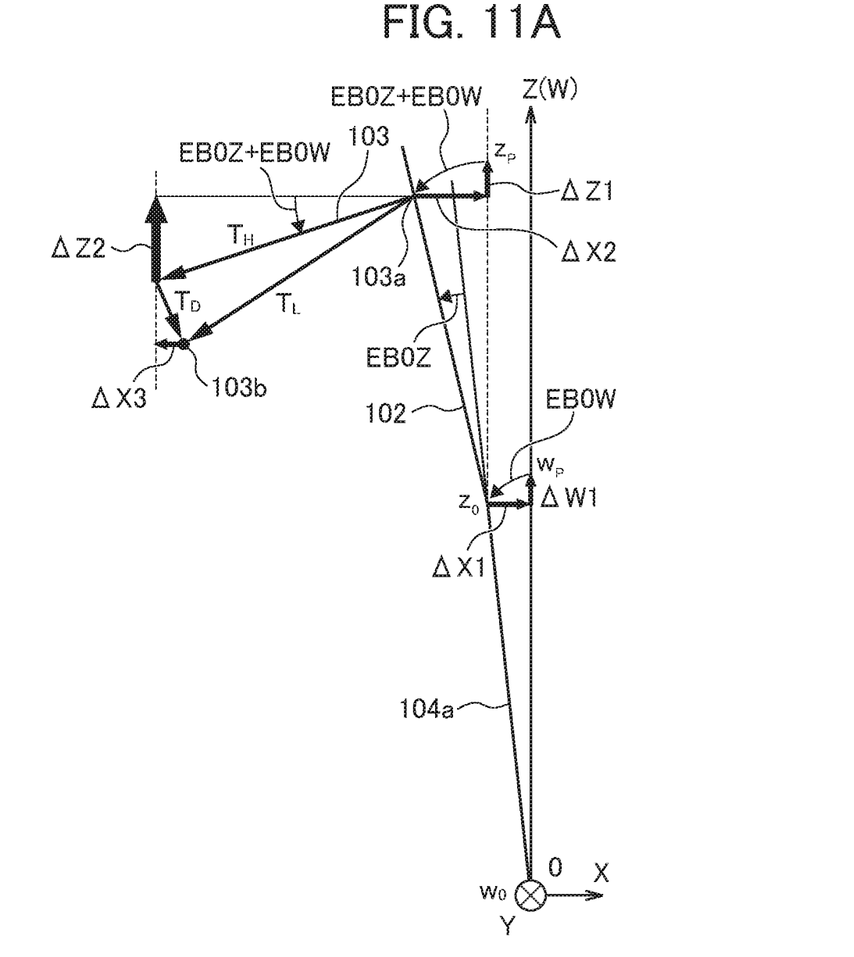
FIG. 11A is a diagram showing the tilt directions of the column in the machine tool having the additional axis by vectors.
Figure 11B:
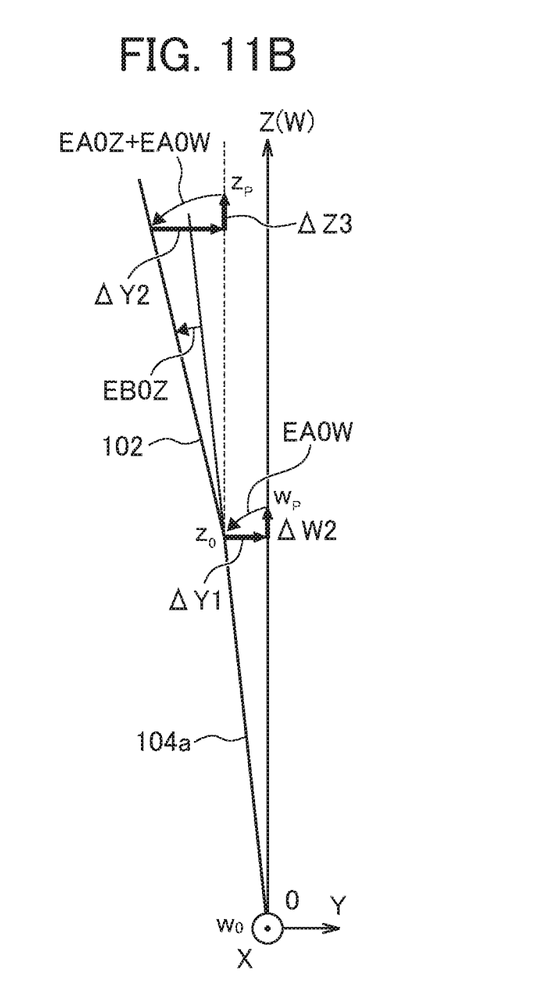
FIG. 11B is a diagram showing the tilt directions of the column in the machine tool having the additional axis by vectors.

It is assumed herein that tilt of the column 102 in two directions E1, E2 with respect to the bed 101 is caused as shown in FIGS. 7A and 7B. It is assumed that tilt of the cross rail 104 in two directions E3, E4 with respect to the bed 101 is caused. In this case, on the column tilt direction selection screen 720, the tilt directions E1, E2, E3, E4 are selected and inputted by the operator, and are set in the tilt direction setting unit 72. Note that although the actual tilt angle of the column 102 is invisibly small, the tilt angle of the column 102 is exaggerated in FIGS. 7A and 7B for easy understanding. FIGS. 11A and 11B show, by vectors, the tilt direction of the column 102 shown in FIGS. 2A and 2B.

Figure 10:
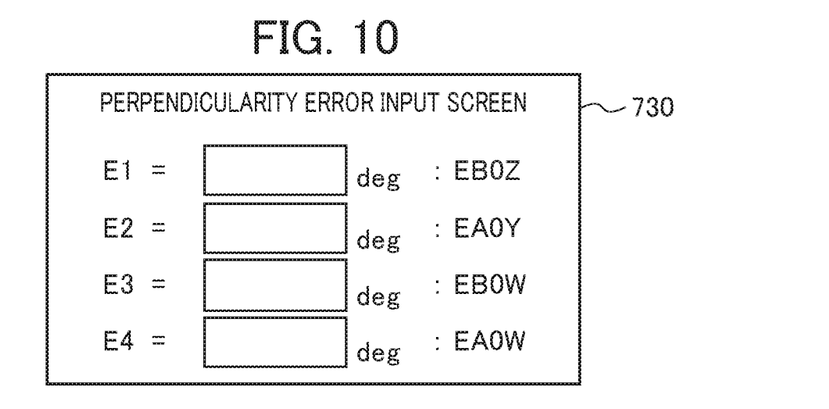
FIG. 10 is a view showing a perpendicularity error input screen in a perpendicularity error setting unit in the numerical control apparatus according to another aspect of the present disclosure.

The perpendicularity error setting unit 73 accepts, from the operator, the input of the tilt angle of the column 102 and the tilt angle of the cross rail 104 in the tilt directions E1, E2, E3, E4 of the column 102 and the cross rail 104 selected and inputted by the operator in the tilt direction setting unit 72, thereby setting these inputted tilt angles. The input is made on the perpendicularity error input screen 730 as shown in FIG. 10, for example. The tilt angle of the column 102 and the tilt angle of the cross rail 104 are perpendicularity errors in the tilt directions E1, E2 of the column 102 and the tilt directions E3, E4 of the cross rail 104. Four tilt angles in the inputted tilt directions E1, E2, E3, E4 are each automatically converted into ISO/JIS standard data.

When each type of information described above is set in the compensation data setting unit 7, the compensation data setting unit 7 outputs each type of set information to the compensation amount calculation unit 8. The compensation amount calculation unit 8 acquires, from the tool length compensation amount acquisition unit 81, the tool length $T_H$ and the tool diameter $T_D$ based on the G-code for tool length compensation and the G-code for tool diameter compensation in the numerical control program of the numerical control apparatus 1, thereby generating the tool vector $T_L$.

The additional axis determination unit 83 determines, from the information of the linear drive axis combination setting unit 71, whether or not there is an additional axis (the W-axis) moving in parallel with any of the moving axes (the X-, Y-, and Z-axes) of the column 102 in the machine tool 100A.

The position compensation amount calculation unit 84 calculates the position compensation amounts $\Delta X$, $\Delta Y$, $\Delta Z$, $\Delta W$ of the tool tip end 103b for each of the X-, Y-, Z-, and W-axes including the additional axis from each type of information on the linear drive axis combinations, the tilt directions, and the perpendicularity errors of the column 102 and the cross rail 104 transmitted from the compensation data setting unit 7 and the above-described tool vector $T_L$. Specifically, as shown in FIGS. 11A and 11B, the position compensation amounts $\Delta X$, $\Delta Y$, $\Delta Z$, $\Delta W$ are obtained according to the following calculation formulae.

$$\Delta X = \Delta X1 + \Delta X2 - \Delta X3 = (W_P \cdot EB0W)_X + \{Z_P \cdot (EB0Z + EB0W)\}_X - \{T_L \cdot (EB0Z + EB0W)\}_X$$

$$\Delta Y = \Delta Y1 + \Delta Y2 = (W_P \cdot EA0W)_Y + \{Z_P \cdot (EA0Z + EA0W)\}_Y$$

$$\Delta Z = \Delta Z1 + \Delta Z2 + \Delta Z3 = \{Z_P \cdot (EB0Z + EB0W)\}_Z + \{T_L \cdot (EB0Z + EB0W)\}_Z + \{Z_P \cdot (EA0Z + EA0W)\}_Z$$

$$\Delta W = \Delta W1 + \Delta W2 = (W_P \cdot EB0W)_W + (W_P \cdot EA0W)_W$$

In the above-described formulae, $Z_P$ indicates Z-axis machine coordinates (tool position), $W_P$ indicates W-axis machine coordinates (column position), $Z_0$ indicates Z-axis machine origin, $W_0$ indicates W-axis machine origin, EB0Z indicates the perpendicularity (radian) of the Z-axis about the Y-axis, EA0Z indicates the perpendicularity (radian) of the Z-axis about the X-axis, EB0W indicates the perpendicularity (radian) of the W-axis about the Y-axis, EA0W indicates the perpendicularity (radian) of the W-axis about the X-axis, $\{Z_P \cdot (EB0Z + EB0W)\}_X$ and $\{T_L \cdot (EB0Z + EB0W)\}_X$ each indicate X-axis components rotating $Z_P$ and $T_L$ by "EB0Z+EB0W", $\{Z_P \cdot (EA0Z + EA0W)\}_Z$ indicates a Y-axis component rotating $Z_P$ by "EA0Z+EA0W", $\{Z_P \cdot (EB0Z + EB0W)\}_Z$ and $\{T_L \cdot (EB0Z + EB0W)\}_Z$ each indicate Z-axis components rotating $Z_P$ and $T_L$ by "EB0Z+EB0W", $\{Z_P \cdot (EA0Z + EA0W)\}_Z$ indicates a Z-axis component rotating $Z_P$ by "EA0Z+EA0W", $(W_P \cdot EB0W)_X$ indicates an X-axis component rotating $W_P$ by EB0W, $(W_P \cdot EA0W)_Y$ indicates a Y-axis component rotating $W_L$ by EA0W, $(W_P \cdot EB0W)_W$ indicates a W-axis component rotating $W_P$ by EB0W, and $(W_P \cdot EA0W)_W$ indicates a W-axis component rotating $W_P$ by EA0W.

The compensation amount calculation unit 8 outputs the position compensation amounts $\Delta X$, $\Delta Y$, $\Delta Z$, $\Delta W$ obtained as described above in the position compensation amount calculation unit 84 to the compensation unit 5. The compensation unit 5 adds each of the position compensation amounts ΔX, ΔY, ΔZ, ΔW transmitted from the compensation amount calculation unit 8 to a corresponding one of the X-, Y-, Z-, and W-axis speed commands transmitted from the X-, Y-, Z-, and W-axis acceleration/deceleration command generation units 4X, 4Y, 4Z, 4W. With this configuration, the compensation unit 5 outputs each of the X-, Y-, Z-, and W-axis speed commands after the perpendicularity error of the column 102 has been compensated to a corresponding one of the X-, Y-, Z-, and W-axis servos 6X, 6Y, 6Z, 6W. Thus, each of the X-, Y-, Z-, and W-axis drive motors (not shown) rotatably controlled by the X-, Y-, Z-, and W-axis servos 6X, 6Y, 6Z, 6W can relatively move the tool 103 and the workpiece (not shown) along each of the X-, Y-, Z-, and W-axes according to the speed command after the perpendicularity error of the column 102 has been compensated according to the tool length and the tool diameter.

As described above, the user (the operator) only selects and inputs the linear drive axis combination, the tilt direction, and the perpendicularity error of the column 102 of the machine tool 100 on the column linear drive axis combination selection screen 710, the column tilt direction selection screen 720, and the perpendicularity error input screen 730 displayed in the compensation data setting unit 7 so that the numerical control apparatus 1 can automatically calculate, in consideration of not only a tool length difference but also a tool diameter difference, the position compensation amount of the machining point of the tool 103 for the perpendicularity error. Thus, according to the numerical control apparatus 1, the perpendicularity error due to the chronological change in the machine tool 100 can be easily compensated by the user (the operator).

Similarly, even in a case where the machine tool is the machine tool 100A having the additional axis (the W-axis), the user (the operator) only selects and inputs the linear drive axis combination, the tilt direction, and the perpendicularity error of the column 102 including the additional axis (the W-axis) so that the numerical control apparatus 1 can automatically calculate, in consideration of not only the tool length difference but also the tool diameter difference, the position compensation amount of the machining point of the tool 103 for the perpendicularity error. Thus, according to the numerical control apparatus 1, the perpendicularly error due to the chronological change in the machine tool 100A having the additional axis can be also easily compensated by the user (the operator).

EXPLANATION OF REFERENCE NUMERALS

1 numerical control apparatus
7 compensation data setting unit
8 compensation amount calculation unit
102 column
103 tool
103*a* tool attachment position
103*b* tool tip end
104 cross rail
$T_H$ tool length
$T_D$ tool diameter
$T_L$ tool vector

What is claimed is:

1. A numerical control apparatus for controlling a tool attached to a column, comprising:
    a compensation data setting unit that sets, as selection input, a linear drive axis combination of the column, a tilt direction of the column, and a perpendicularity error of the column; and
    a compensation amount calculation unit that generates a tool vector from a tool length as a distance in an axial direction from an attachment position of the tool to a tool tip end and a tool diameter as a distance in a direction perpendicular to the axial direction from the attachment position of the tool to the tool tip end to calculate a position compensation amount of the tool tip end as a machining point in an execution program from the linear drive axis combination of the column, the tilt direction of the column, and the perpendicularity error of the column set by the compensation data setting unit and the tool vector.

2. The numerical control apparatus according to claim 1, wherein
    the column is provided and operated on a cross rail,
    the compensation data setting unit is further configured to select and input a linear drive axis combination of the cross rail, a tilt direction of the cross rail, and a perpendicularity error of the cross rail, and
    the compensation amount calculation unit is further configured to calculate the position compensation amount of the tool tip end from the linear drive axis combination of the cross rail, the tilt direction of the cross rail, and the perpendicularity error of the cross rail.

* * * * *